March 16, 1965  R. B. APPLEGATE  3,173,194
METHOD OF MAKING AN ARMATURE
Filed Oct. 12, 1961

INVENTOR.
ROBERT B. APPLEGATE
BY
Oberlin, Maky & Donnelly
ATTORNEYS 3,173,194
METHOD OF MAKING AN ARMATURE
Robert B. Applegate, North Olmsted, Ohio, assignor to Cleveland Electrical Equipment Co., Inc., Cleveland, Ohio, a corporation of Ohio
Filed Oct. 12, 1961, Ser. No. 144,646
6 Claims. (Cl. 29—155.53)

This invention relates to wound armatures and, more particularly, to a method of constructing wound armatures for dynamoelectric machines.

Conventional armatures or rotors for electric motors or generators comprise a shaft with a plurality of laminations tightly fitted thereon to form an armature body. The laminations and consequently the body, are usually formed with wire-receiving slots such as shown in FIG. 3 of my U.S. Patent 2,714,174, issued July 26, 1955, or in FIG. 26 of Hunsdorf, U.S. Patent 2,718,359, issued September 20, 1955. When armatures of this type are wound, the slots are usually first provided with U-shaped inserts of insulation; after the wire coils are wound therein, they are held in place by wedges inserted within the restricted openings over the coils. The necessity of inserting the insulation and the wedges together with winding coils in slots with restricted openings makes the above-described operation difficult necessitating the use of high-precision winding machinery.

It is, therefore, an object of this invention to provide a simple method of winding slotted armatures which dispenses with the steps of inserting pre-formed insulating strips and wedges.

Another object is to provide such a method wherein open, U-shaped slots can be used instead of the conventional relatively inaccessible slots having restricted openings.

A further object is to provide such a method of constructing armatures, the bodies of which are encased in a tube or the like having a larger, exposed flux-carrying area on the surface thereof.

Yet another object is to provide such a method wherein armatures may be produced from simpler, and less expensive laminated bodies.

A still further object is to provide such a method wherein armatures may be produced with greater ease by winding machines without the necessity of providing for high-precision clearances and tolerances during the coil-winding step.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
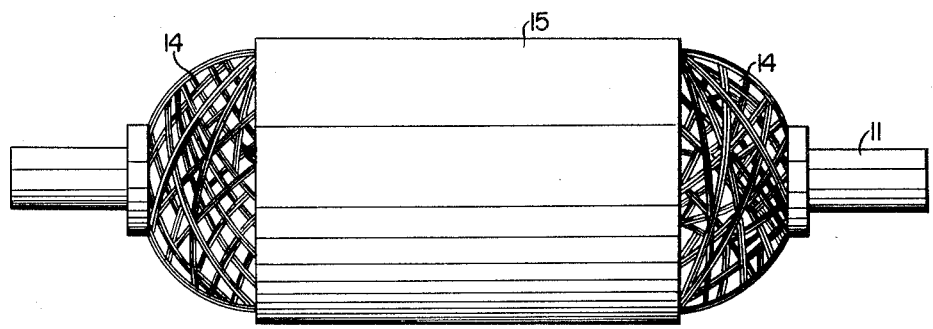
FIG. 1 is a side elevation view of an armature of the instant invention.
Figure 2:
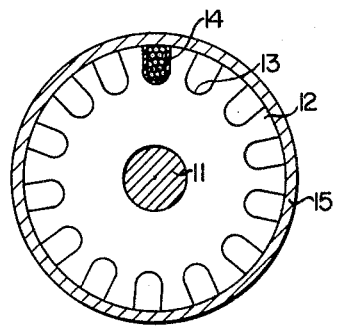
FIG. 2 is a sectional view along line 2—2 of FIG. 1 showing the wire coil in only one of the several slots.

Referring now to the drawings in detail, a shaft 11 is provided on which are tightly fitted a plurality of laminations 12. The laminations are provided with open slots 13; preferably, these slots will have straight sides which are preferably halfway between being radial and parallel. An adhesive liquid is sprayed into the open slots 13; preferably, this will be accomplished by multiple stationary jets positioned near the open slots as the assembly is automatically drawn through the jet-spray mechanism. The adhesive material should be a non-aqueous base adhesive having suitable insulating varnish, epoxy resin or the like. Either air drying or oven baked materials are suitable and may be used depending upon the cost factors and available oven baking equipment in the plant conducting the operation. While the thickness of the resin coating is not critical, a layer of adhesive of from about 0.002 to about 0.005 inch is preferred.

Next, a finely divided insulating material is sprayed into the slots which is held in place by the adhesive. This may also be accomplished by multiple stationary jets with a moving assembly. The material may be a fibrous flock such as rayon, dacron or cotton and is preferably cut to an accurate length, e.g., about 1/16 inch. The material, however, need not be fibrous as powdered mica or other insulating material will be quite satisfactory. A uniform layer of about 0.003 to about 0.01 inch is particularly preferred. These two steps will provide a firmly adhered layer of insulation in each slot. To obtain a greater uniformity of application of the above two materials it has been found that electrostatic spraying is more effective in covering the high points and sharp edges than conventional spraying, dipping or coating. Further, it is quite desirable to mix the fibrous material with the adhesive and spray it in one single operation.

The wire coils 14 are then wound into the slots in a conventional manner, e.g., such as disclosed in U.S. Patents 2,714,174; 2,718,359; or 2,883,119. However, since open slots without restrictions are used, the positioning of the winding fingers of the wire winding machine is not so critical and the need for high-precision operation is substantially reduced.

Once the armature is wound, the laminated body is then enclosed in a flux-carrying metal sheath 15. This may be accomplished by shrinking an iron or steel tube over the body, or a flat metal strip may be spirally wound around the body being spot-welded to numerous points of the spokes of the peripheral ends of the laminations 12. The metal sheath is preferably thin, for example, about 1/32 inch in thickness, to minimize bypass flux loss. However, the size can be varied to vary the copper to iron ratio present in the armature to improve efficiency and the like. The sheath is preferably of low carbon steel, e.g., about 0.06 to about 0.09 carbon content; ingot magnetic iron would be a particularly suitable material.

While the above-described invention may be utilized in the construction of any armature, it is particularly useful in the manufacture of armatures for low voltage D.C. generators. A greater flexibility is realized as well as a reduction in cost of operation.

Other modes of applying the principle of the invention may be employed, change being made as regards the details described, provided the features stated in any of the following claims or the equivalent of such be employed.

I therefore, particularly point out and distinctly claim as my invention:

1. The method of making an armature having a slotted body mounted on a shaft which comprises spraying a tacky adhesive substance into the slots of said body, spraying a finely divided fibrous material into said adhesive-coated slots to form a non-conductive layer therein, winding coils in said slots, and shrinking a thin iron tube over said armature body to enclose said body tightly within said iron tube.

2. A method of making an armature having a slotted body mounted on a shaft which comprises spraying a tacky adhesive into the slots in said body, spraying a finely divided fibrous material into said adhesive-coated slots to form a non-conductive layer therein, winding coils in said slots, and spirally winding a flat metal strip around the outside of said armature and bonding said spiral windings together to form a sheath and enclose tightly said body therein.

3. A method of making an armature having a slotted body mounted on a shaft which comprises the steps of applying a tack adhesive substance into the lsots of said body, applying a finely divided insulating material to said adhesive-coated slots while said adhesive is in a tacky condition to form a non-conductive layer therein, winding coils in said slots, and tightly enclosing said wound armature body in a thin, flux-carrying metal sheath whereby said sheath is in firm peripheral contact with said body.

4. A method according to claim 3 wherein said adhesive and said fibrous material are electrostatically sprayed.

5. A method according to claim 3 wherein said adhesive and said fibrous material are mixed together and sprayed simultaneously.

6. A method of making an armature having a slotted body mounted on a shaft which comprises applying a layer of about 0.002 to about 0.005 inch thickness of a tacky adhesive substance into the slots of said body, applying a uniform layer of about 0.003 to about 0.01 inch thickness of a finely divided insulating material to said adhesive-coated slots while said adhesive is in a tacky condition to form a non-conductive layer therein, winding coils in said slots, and tightly enclosing said wound armature body in a thin, flux-carrying metal sheath and bonding said metal sheath to said armature body.

References Cited by the Examiner
UNITED STATES PATENTS

| | | | |
|---|---|---|---|
| 1,861,036 | 5/32 | Thordarson | 310—86 |
| 1,920,354 | 8/33 | Carpenter | 29—155.53 |
| 2,422,592 | 6/47 | Sigmund et al. | 310—86 |
| 2,465,296 | 3/49 | Swiss | 310—215 |
| 2,483,024 | 9/49 | Roters | 29—155.53 |
| 2,631,251 | 3/53 | Spielman | 310—215 |
| 2,677,626 | 5/54 | Bodle et al. | 117—93.4 |
| 2,701,317 | 2/55 | Herman | 310—215 |
| 2,723,918 | 11/55 | Nichols | 117—18 |
| 2,763,916 | 9/56 | Korski | 29—155.53 |
| 2,822,483 | 2/58 | De Jean et al. | 310—45 |

WHITMORE A. WILTZ, *Primary Examiner.*

ORIS L. RADER, *Examiner.*